(12) United States Patent
Hasegawa et al.

(10) Patent No.: US 7,503,415 B2
(45) Date of Patent: Mar. 17, 2009

(54) ENGINE SUPPORT STRUCTURE OF MOTORCYCLE

(75) Inventors: Yosuke Hasegawa, Saitama (JP); Katsumasa Mukai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 11/511,430

(22) Filed: Aug. 29, 2006

(65) Prior Publication Data

US 2007/0045025 A1  Mar. 1, 2007

(30) Foreign Application Priority Data

Aug. 31, 2005 (JP) ............................. 2005-251552
Nov. 28, 2005 (JP) ............................. 2005-341563

(51) Int. Cl.
*B62D 61/02* (2006.01)

(52) U.S. Cl. ..................... 180/228; 180/219; 280/291

(58) Field of Classification Search ................ 180/228, 180/219; 280/291
See application file for complete search history.

(56) References Cited

U.S. PATENT DOCUMENTS

| | | | | |
|---|---|---|---|---|
| 3,180,594 A | * | 4/1965 | Connell | 248/612 |
| 3,542,146 A | * | 11/1970 | Trigg et al. | 180/228 |
| 3,643,636 A | * | 2/1972 | Miley et al. | 123/41.69 |
| 3,800,820 A | * | 4/1974 | Trunnell | 137/334 |
| 5,069,414 A | * | 12/1991 | Smith | 248/638 |
| 5,143,358 A | * | 9/1992 | Hibi et al. | 267/140.13 |
| 5,720,638 A | * | 2/1998 | Hale | 440/83 |
| 5,857,538 A | * | 1/1999 | Chambers | 180/219 |
| 6,712,655 B1 | * | 3/2004 | Schlemmer et al. | 440/111 |
| 7,350,777 B2 | * | 4/2008 | Ogawa et al. | 267/141.1 |

FOREIGN PATENT DOCUMENTS

| | | | |
|---|---|---|---|
| JP | 58-33390 U | | 3/1983 |
| JP | UM-A-3-5590 | * | 3/1991 |

* cited by examiner

*Primary Examiner*—Paul N Dickson
*Assistant Examiner*—Patrick Centolanzi
(74) *Attorney, Agent, or Firm*—Birch, Stewart, Kolasch & Birch, LLP

(57) ABSTRACT

An engine support bracket for a motorcycle is formed as an L-shaped channel member that is horizontally mounted on a vehicle body frame. Mounting portions of an engine are mounted on the L-shaped channel member and are fastened to the L-shaped channel member using a bolt. With this arrangement, assembling of the engine onto the vehicle body frame can be completed with a simple operation, and hence, the operability in assembling the engine is enhanced. Further, as parts for connecting the engine to the vehicle body frame, only the L-shaped channel member need be provided. Thus, the number of parts is decreased thus also providing a simple structure. Further, a head of the bolt and a nut, which fix the engine to the vehicle body frame, do not appear on a side surface of the mounting portions of the engine. Hence, the appearance of the motorcycle is enhanced.

10 Claims, 6 Drawing Sheets

ENGINE SUPPORT STRUCTURE OF MOTORCYCLE

CROSS-REFERENCE TO RELATED APPLICATION

The present application claims priority under 35 U.S.C. §119 to Japanese Patent Application No. 2005-251552, filed Aug. 31, 2005, and Japanese Patent Application No. 2005-341563, filed Nov. 28, 2005, the entire contents of which are hereby incorporated by reference.

BACKGROUND OF THE INVENTION

1. Field of the Invention

The present invention relates to an engine support structure of a motorcycle which is suitable for a motorcycle of an American-type or other type.

2. Description of Background Art

Conventionally, as an engine support structure of a motorcycle of this type, there has been known an engine support structure which generally and widely adopts a technique in which an engine is fastened to a vehicle body frame by mounting a holding member on a vehicle body frame and by inserting a bolt into the holding member and a mounting portion of the engine (See, for example JP-UM-A-58-33390 (FIG. 1)).

Further, as another engine support structure, there has been proposed an engine support structure which adopts a technique in which a pipe is laterally (horizontally) extended between a pair of down tubes and a stay is fastened to the pipe using a bolt, and an engine is mounted on the stay (for example, see JP-UM-A-3-5590 (FIG. 4 to FIG. 6).).

However, in JP-UM-A-58-33390 (FIG. 1), in assembling the engine, it is necessary to align a fastening hole with the holding member while supporting the engine and hence, there has been a demand for reducing the difficulty of the assembling operation of the engine.

On the other hand, in JP-UM-A-3-5590 (FIG. 4 to FIG. 6), in assembling the engine, it is necessary to insert the bolt vertically from below to above. Further, as parts for connecting the engine to down tubes, two parts such as the pipe and the stay are necessary and hence, the number of parts is increased and also the structure of the engine assembling becomes complicated.

Further, in JP-UM-A-58-33390 (FIG. 1) and JP-UM-A-3-5590 (FIG. 4 to FIG. 6), in the vicinity of the mounting portion of the engine, a head of the bolt and a nut which fixedly mount the engine on the vehicle body frame are exposed on a side surface. However, by making the head of the bolt and the nut hardly observed from the outside, it is possible to enhance the appearance of the motorcycle.

SUMMARY AND OBJECTS OF THE INVENTION

Accordingly, it is a first object of the present invention to provide an engine support structure of a motorcycle which can enhance the assembling operability in assembling the engine without increasing the number of parts.

Further, it is a second object of the present invention to provide an engine support structure of a motorcycle which can allow a fastening member in the vicinity of the mounting portion of the engine to be hardly viewed from outside.

First of all, according to a first aspect of the present invention, in the engine support structure of the motorcycle, an engine support bracket is horizontally mounted on a vehicle body frame, and the mounting portion of the engine is mounted on the engine support bracket from above and is fastened to the engine support bracket using a bolt. Fastening holes which are formed in the engine support bracket and the mounting portion of the engine are arranged between a pair of left and right down tubes of the vehicle body frame as viewed in a front view and are overlapped to the vehicle body frame as viewed in a side view.

In addition, according to a second aspect of the present invention, the mounting portion of the engine is fastened to the engine support bracket using the bolt which is dropped vertically.

Further, according to a third aspect of the present invention, the engine support bracket is extended between the pair of left and right down tubes.

Further, according to a fourth aspect of the present invention, the engine support bracket is an L-shaped channel member.

Still further, according to a fifth aspect of the present invention, the vibration damping member is interposed between the engine support bracket and the mounting portion of the engine.

According to the present invention as describe above, assembling of an engine to a vehicle body frame is completed by merely horizontally mounting the engine support bracket on the vehicle body frame, and by mounting and connecting the mounting portion of the engine to the engine support bracket and hence, the assembling operability can be largely enhanced in assembling the engine.

Further, as parts for connecting the engine to the vehicle body frame, it is sufficient to provide only the engine support bracket, and hence, the number of parts is decreased thus also providing the simple structure.

Still further, the head of the bolt and the nut which fix the engine to the vehicle body frame do not appear on a side surface of the mounting portion of the engine and hence, the appearance of the motorcycle can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
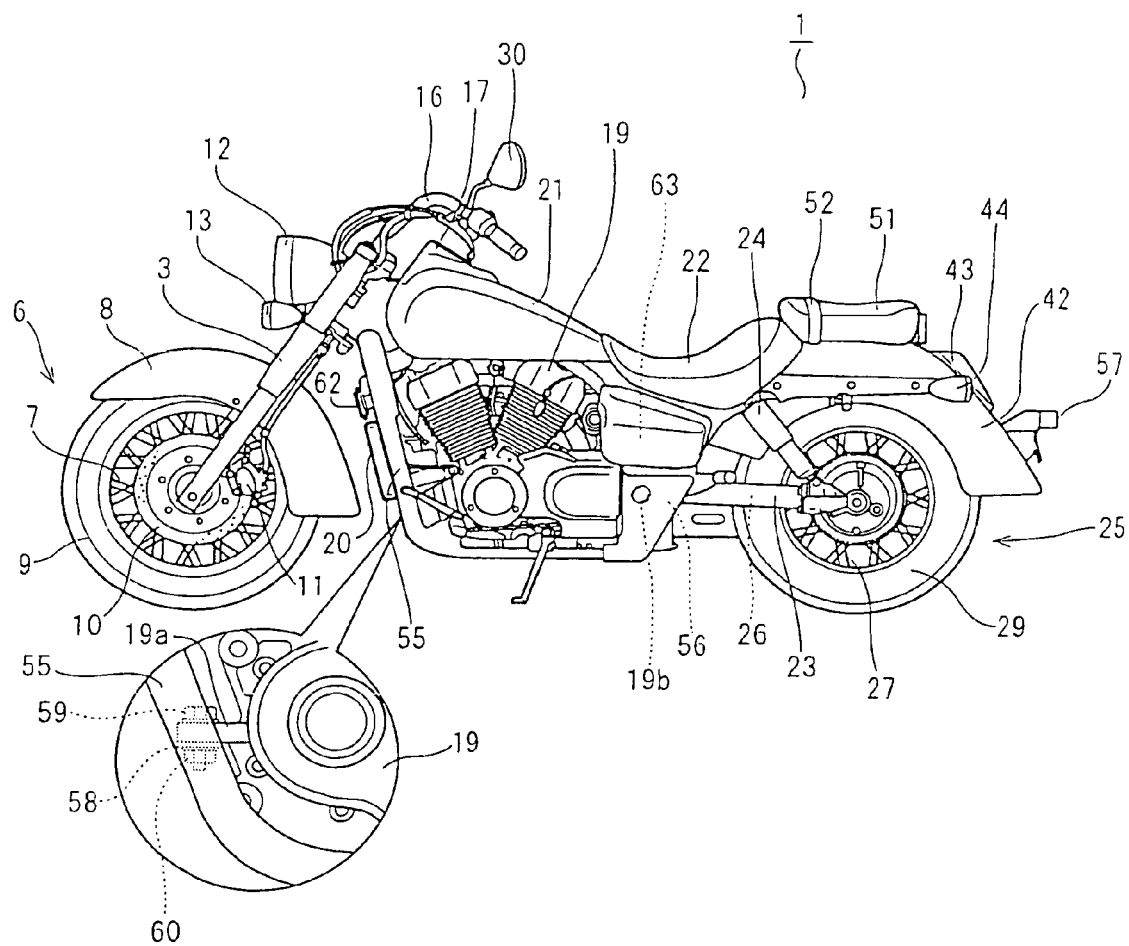
FIG. 1 is a side view showing a first embodiment of a motorcycle according to the present invention.
Figure 2:
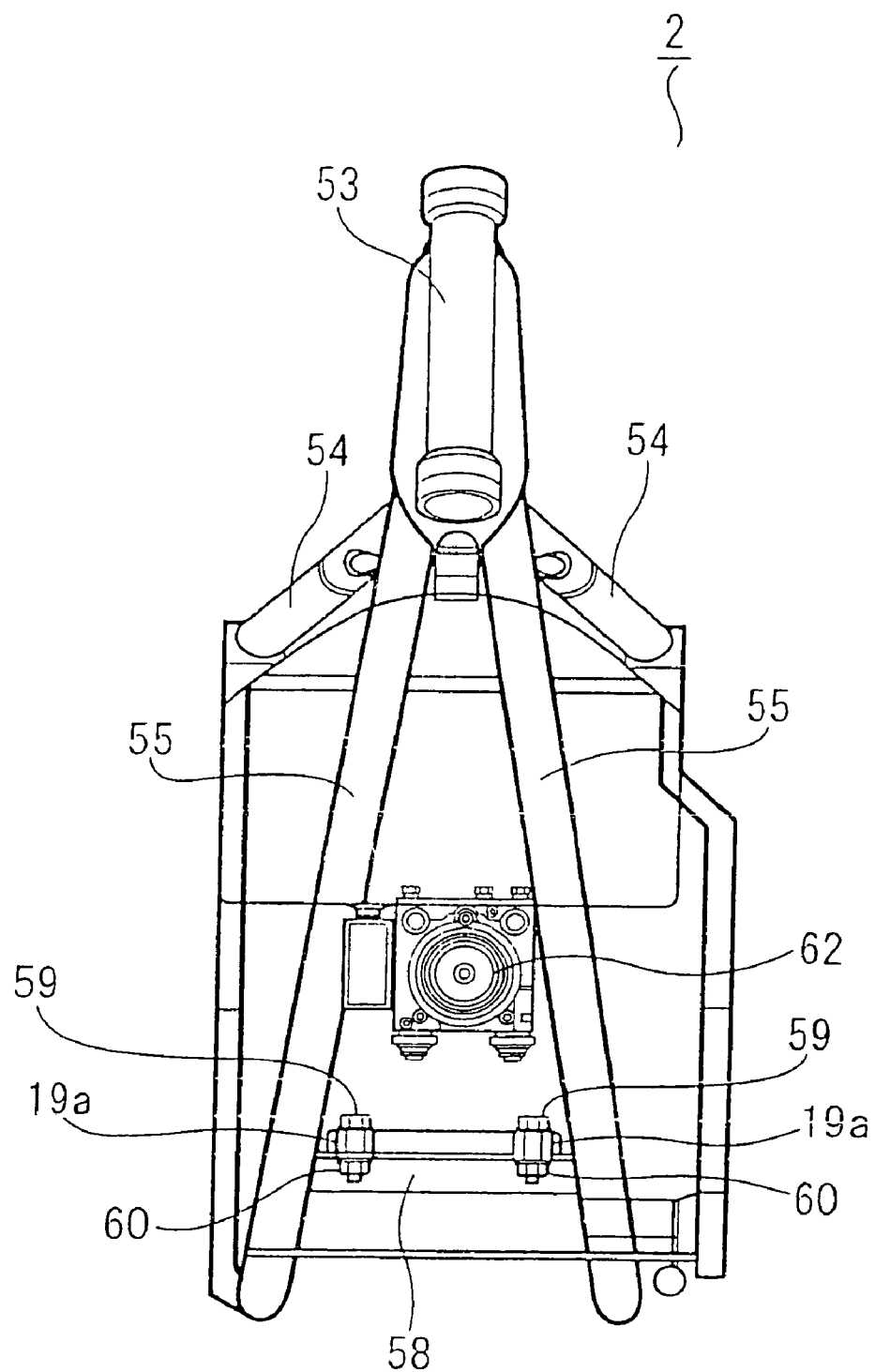
FIG. 2 is a front view of a vehicle body frame of the motorcycle shown in FIG. 1.

As shown in FIG. 1 and FIG. 2, an American-type motorcycle 1 includes a double-cradle-type vehicle body frame 2. The vehicle body frame 2 is constituted of a cylindrical head pipe 53, a pair of left and right main frames 54 which is integrally welded to a rear portion of the head pipe 53, a pair of left and right down tubes 55 which is integrally welded to a lower portion of the head pipe 53, and a center frame 63 which connects the down tubes 55 to the main frames 54.

Further, as shown in FIG. 1, a front fork 3 is rotatably connected to the head pipe 53. A front wheel 6 is rotatably supported on a lower end portion of the front fork 3. The front wheel 6 is constituted of a spoke-type front wheel 7 and a front tire 9 and the like. Here, the front wheel 7 is rotatably supported on a lower end portion of the front fork 3, the front tire 9 is mounted on an outer peripheral portion of the front wheel 7. Further, an annular front brake disc 10 is fixedly secured to a side portion of the front wheel 7, a front brake caliper 11 is mounted on the front brake disc 10. Still further, a front fender 8 is arranged above the front wheel 6 in a state that the front fender 8 is supported on the front fork 3.

On the other hand, as shown in FIG. 1, a head light 12, a pair of left and right front blinkers 13 and a steering handle 16 are mounted on an upper end portion of the front fork 3, and a pair of left and right back mirrors 30 is mounted on the steering handle 16.

Figure 3:
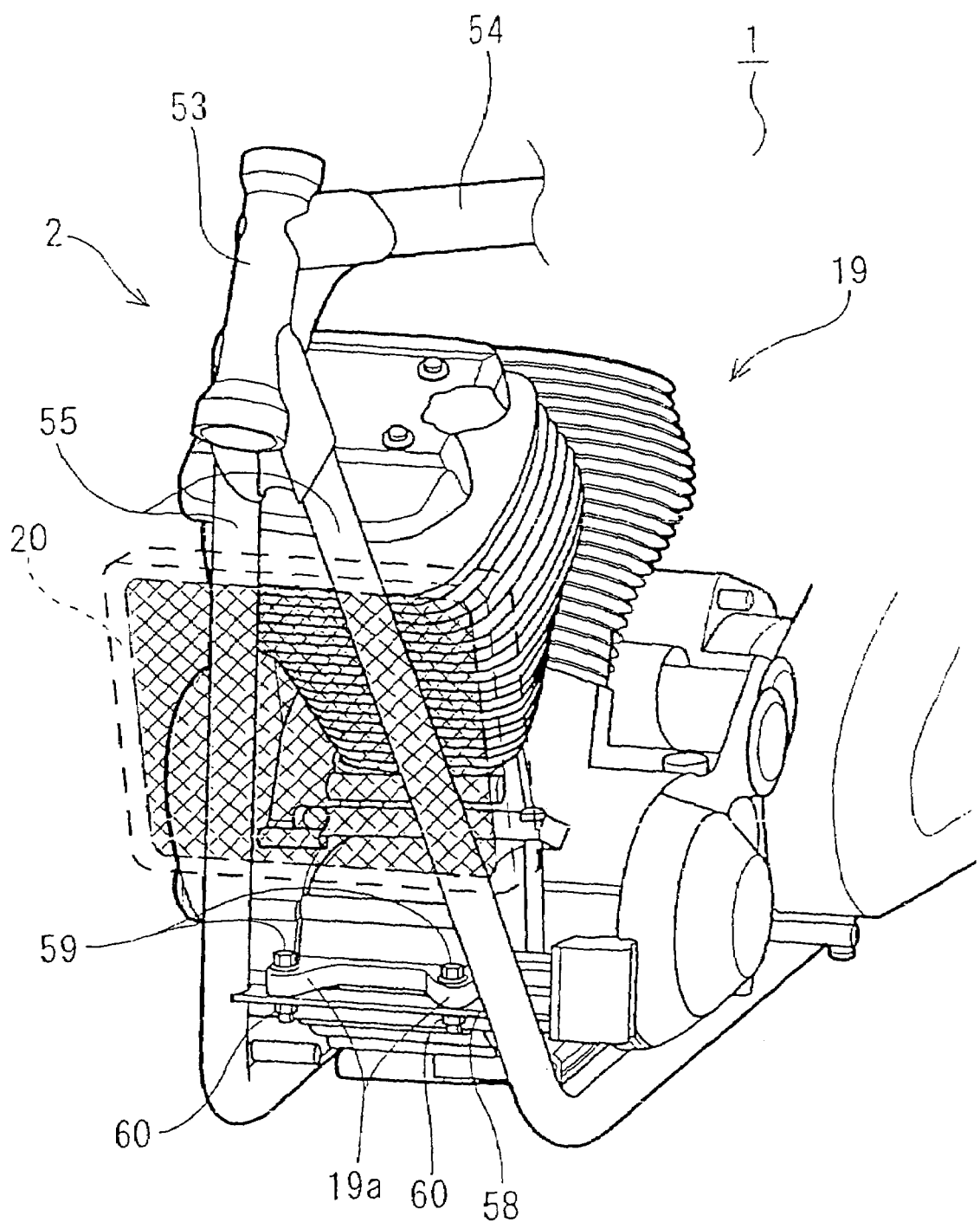
FIG. 3 is a perspective view around an engine of the motorcycle shown in FIG. 1.
Figure 4:
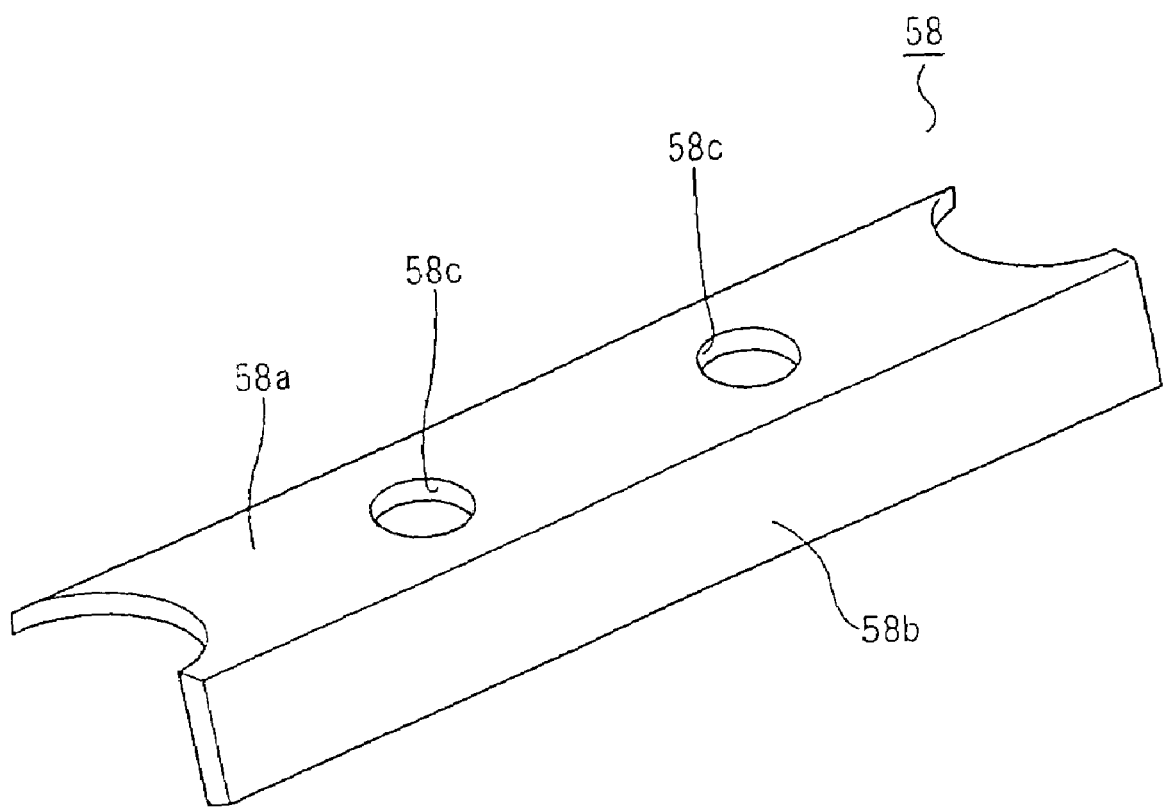
FIG. 4 is a perspective view of an L-shaped channel member.
Figure 5:
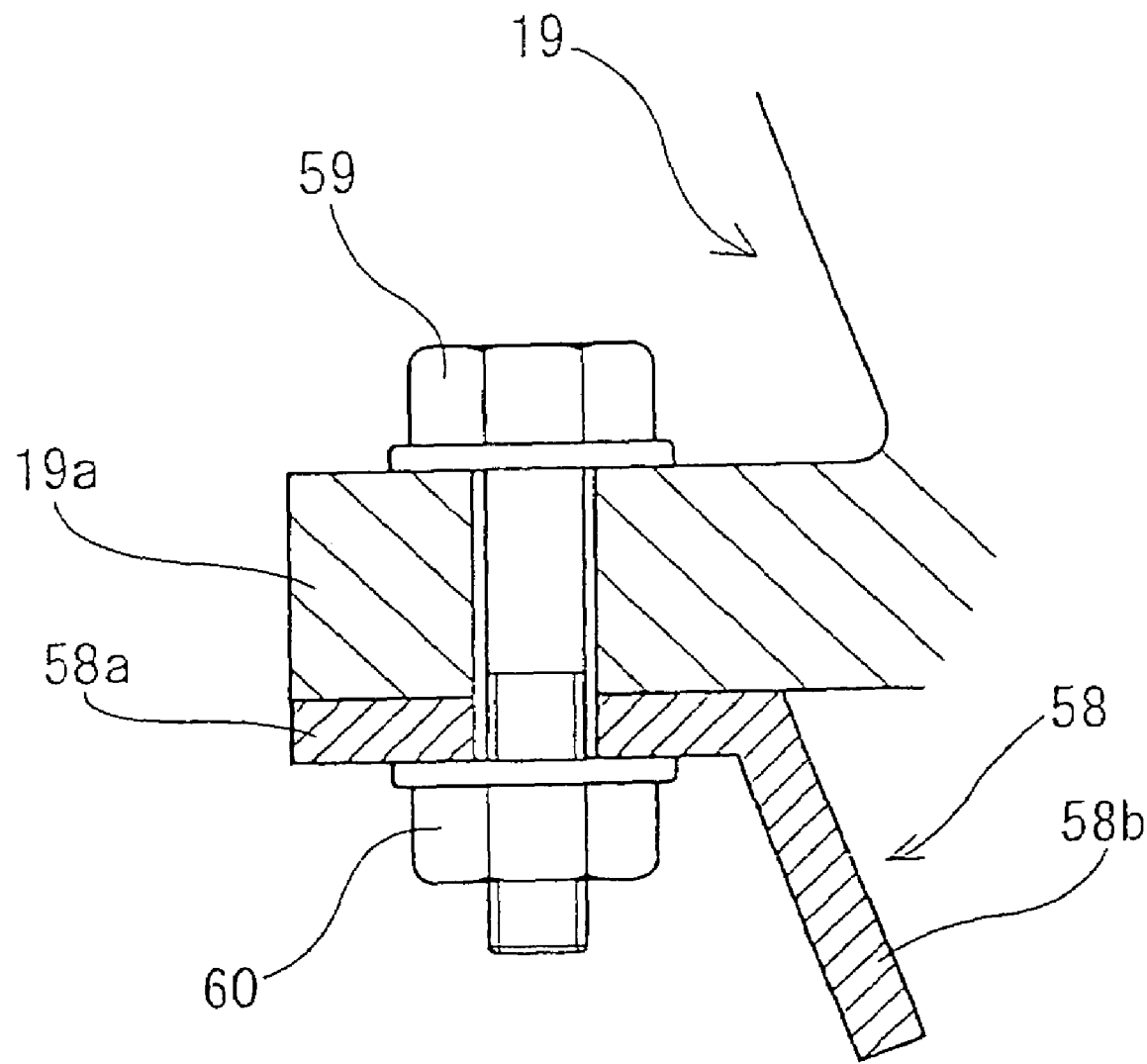
FIG. 5 is a cross-sectional view of an essential part of the motorcycle shown in FIG. 1.

Further, as shown in FIG. 1 and FIG. 3, a water-cooled V-type two-cylinder engine 19 is horizontally mounted on a center portion of the vehicle body frame 2, and a front end lower portion of the engine 19 is supported on the down tubes 55 of the vehicle body frame 2. That is, as shown in FIG. 2 and FIG. 3, an L-shaped channel member 58 (angled steel) which is used as an engine support bracket is horizontally extended between the pair of left and right down tubes 55. As shown in FIG. 4, the L-shaped channel member 58 is constituted of an elongated plate-shaped horizontal member 58a and an elongated plate-shaped vertical member 58b which is integrally and contiguously formed with the horizontal member 58a at a predetermined angle (for example, 120°). Further, a pair of left and right fastening holes 58c is formed in the horizontal member 58a. Here, these fastening holes 58c are arranged between the pair of left and right down tubes 55 as viewed in a front view, and are overlapped to the down tubes 55 as viewed in a side view. On the other hand, a pair of left and right mounting portions 19a is formed on a front end lower portion of the engine 19. Then, as shown in FIG. 5, these mounting portions 19a are, in a state that the mounting portions 19a are mounted on the L-shaped channel member 58, fastened to the L-shaped channel member 58 by allowing nuts 60 to be threadedly engaged with vertically dropped bolts 59. Further, in front of the engine 19, as shown in FIG. 1 and FIG. 3, a radiator 20 is arranged in a state that the radiator 20 is adhered to front surfaces of the down tubes 55. By allowing cooling water to circulate between the radiator 20 and the engine 19, it is possible to cool the engine 19. Further, a horn 62 is provided above the radiator 20.

Further, as shown in FIG. 1, a fuel tank 21 is placed above the engine 19, and a speedometer (speed meter) 17 is mounted on an upper surface of the fuel tank 21. Further, a front seat 22 is detachably arranged behind the fuel tank 21. A rear seat 51 is detachably arranged on a rear side of the front seat 22, a seat belt 52 is mounted on the rear seat 51. Further, a rear fender 42 is mounted on a lower portion of the rear seat 51, and a stop lamp 43, a pair of left and right rear blinkers 44 and a license light 57 are mounted on the rear fender 42.

Further, as shown in FIG. 1, pivot shaft 56 is inserted in a rear and lower portion of the center frame 63 of the vehicle body frame 2 in the lateral direction (horizontal direction), and the pivot shaft 56 supports a shaft connecting portion 19b positioned at a rear end lower portion of the engine 19. Further, a hollow swing arm (rear fork) 23 is supported on the pivot shaft 56 in a rockable manner, the rear cushion 24 is arranged above the swing arm 23 in a state that the rear cushion unit 24 connects the vehicle body frame 2 and a rear end portion of the swing arm 23. Then, the rear wheel 25 is rotatably supported on a rear end portion of the swing arm 23 below the rear fender 42, a propeller shaft 26 which transmits power of the engine 19 to the rear wheel 25 is rotatably inserted in the inside of the swing arm 23.

As shown in FIG. 1, the rear wheel 25 is constituted of a spoke-type rear wheel 27, a rear tire 29 and the like. Here, the rear wheel 27 is rotatably supported on a rear end portion of the swing arm 23, while the rear tire 29 is mounted on an outer peripheral portion of the rear wheel 27. Further, an annular rear brake disc (not shown in the drawing) is fixedly mounted on a side portion of the rear wheel 27, and a rear brake caliper (not shown in the drawing) is mounted on the rear brake disc.

The motorcycle 1 has the above-mentioned constitution and hence, in assembling the engine 19 to the vehicle body frame 2 for manufacturing the motorcycle 1, the engine 19 is assembled in accordance with following steps.

First of all, the mounting portion 19a positioned at the front end lower portion of the engine 19 is mounted on the horizontal member 58a of the L-shaped channel member 58. Here, the horizontal member 58a of the L-shaped channel member 58 is flat and hence, it is possible to smoothly perform a mounting operation of the mounting portion 19a of the engine 19 without troubles.

Next, in this state, the pivot shaft 56 is laterally inserted in the shaft connecting portion 19b which is positioned at the rear end lower portion of the engine 19. Here, a front end lower portion of the engine 19 is supported on the L-shaped channel member 58 in a stable manner and hence, it is possible to efficiently perform such an inserting operation of the pivot shaft 56 thus enhancing the operability in assembling the engine 19.

Finally, the mounting portion 19a of the engine 19 is fastened to the L-shaped channel member 58 using the bolt 59. That is, as shown in FIG. 5, the bolt 59 is dropped so that the mounting portion 19a of the engine 19 and the horizontal member 58a of the L-shaped channel member 58 are fastened to each other, and the nut 60 is threadedly mounted on a male threaded portion of the bolt 59. Here, the horizontal member 58a of the L-shaped channel member 58 is flat and hence, it is possible to easily perform a fastening operation of the bolt 59. Here, the vertical member 58b functions as a reinforcing rib against a vertical force applied to the horizontal member 58a and hence, the L-shaped channel member 58 exhibits high bending rigidity.

Then, the assembling of the engine 19 to the vehicle body frame 2 is completed.

In this manner, in assembling the engine, the assembling of the engine 19 to the vehicle body frame 2 is completed merely by mounting the L-shaped channel member 58 on the vehicle body frame 2 horizontally, by mounting the mounting portion 19a of the engine 19 on the L-shaped channel member 58, and by fastening the mounting portion 19a to the L-shaped channel member 58 using the bolt 59. Accordingly, it is possible to largely enhance the assembling operability in assembling the engine compared to the prior arts 1, 2.

Further, as the parts for connecting the engine 19 to the vehicle body frame 2, it is sufficient to provide only the L-shaped channel member 58 and hence, it is possible to reduce the number of parts thus providing the simple structure compared to the prior art 2.

In addition, as shown in FIG. 1 and FIG. 2, the mounting portion 19a of the engine 19 is arranged between the pair of down tubes 55 and hence, the bolt 59 and the nut 60 which fix the engine 19 to the vehicle body frame 2 are hidden on a back side of the down tubes 55 as viewed in either left or right direction of the motorcycle 1. Due to such a constitution, the appearance of the motorcycle 1 can be enhanced.

Figure 6:
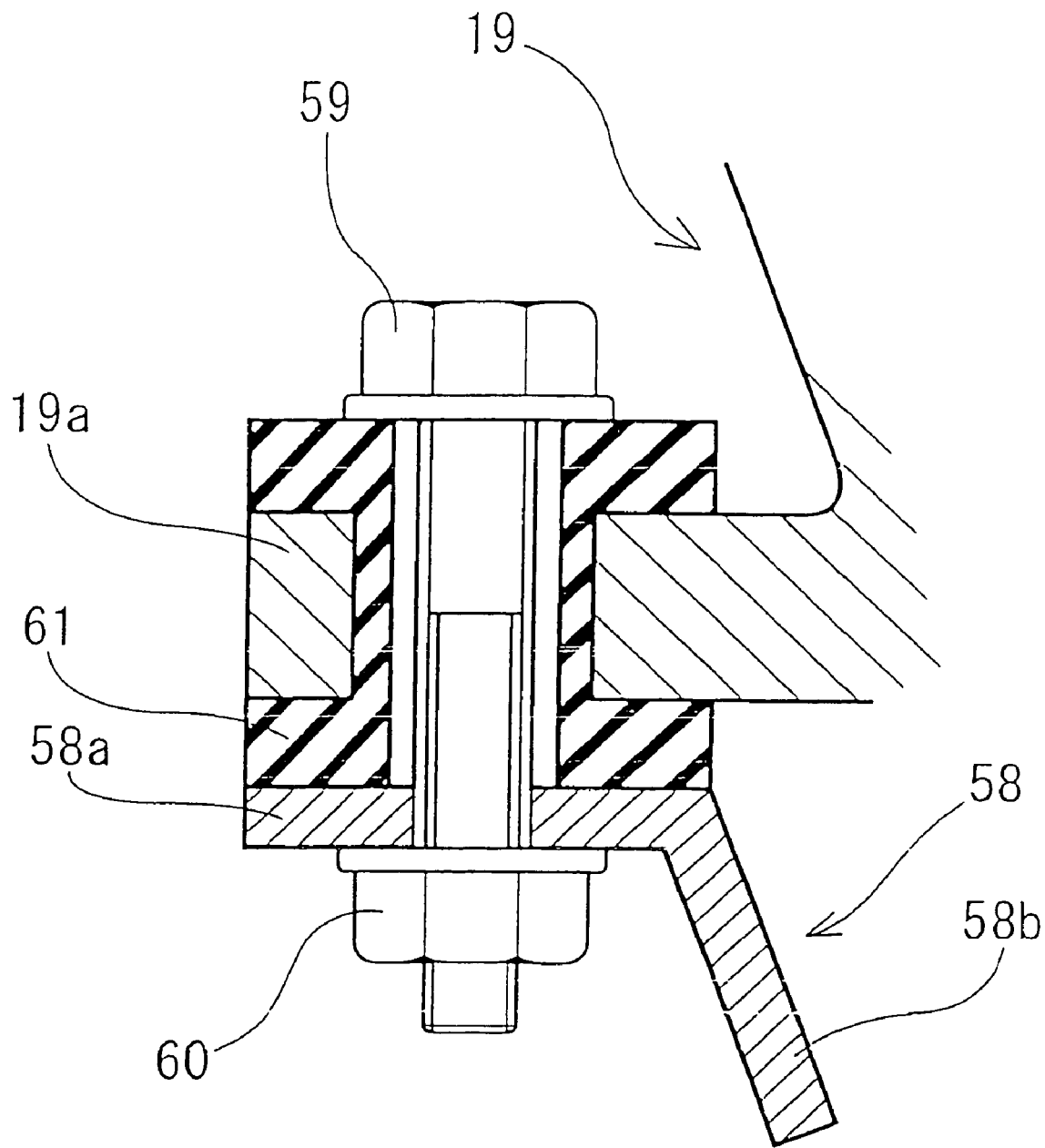
FIG. 6 is a cross-sectional view of an essential part showing a second embodiment of the motorcycle according to the present invention.

FIG. 6 is a cross-sectional view of an essential part showing the second embodiment of the motorcycle according to the present invention.

In the above-mentioned first embodiment, as shown in FIG. 5, the explanation is made with respect to the motorcycle 1 in which the mounting portion 19a of the engine 19 is directly mounted on the L-shaped channel member 58. However, as shown in FIG. 6, an annular vibration damping rubber 61 may be interposed between the L-shaped channel member 58 and the mounting portion 19a of the engine 19.

Due to such a constitution, in addition to the manner of operation and the advantageous effects obtained by the first embodiment, the mounting portion 19a of the engine 19 possesses the vibration damping structure and hence, it is possible to reduce the transmission of vibrations of the engine 19 to the vehicle body frame 2 using the vibration damping rubber 61. Consequently, the riding feeling of the motorcycle 1 is enhanced.

Here, in the above-mentioned embodiments, the explanation is made with respect to the case in which the L-shaped channel member 58 is used as the engine support bracket. However, a hollow sleeve pipe, a hollow square pipe or the like may be used in place of the L-shaped channel member 58.

Here, in the above-mentioned embodiments, the motorcycle 1 which includes the double-cradle-type vehicle body frame 2 is explained. However, a type of the vehicle body frame 2 is particularly not limited to such a vehicle body frame, and the present invention is also applicable to a motorcycle which includes a vehicle body frame 2 of a type other than the double-cradle-type vehicle body frame in the same manner.

Here, in the above-mentioned embodiments, the motorcycle 1 which includes the rear wheel 25 of shaft-drive-type is explained. However, a drive type of the rear wheel 25 is not particularly limited to such a drive type. For example, the present invention is also applicable to a motorcycle 1 which includes a rear wheel 25 of chain-drive-type or belt-drive-type in the same manner.

Here, in the above-mentioned embodiments, the motorcycle 1 which includes the front wheel 7 and rear wheel 27 of spoke-type is explained. However, types of the front wheel 7 and rear wheel 27 are not particularly limited to such a spoke-type. For example, the present invention is also applicable to a motorcycle 1 which adopts a cast wheel, a Comstar wheel, a disc wheel or the like as the front wheel 7 and the rear wheel 27 in the same manner.

Here, in the above-mentioned embodiments, the explanation is made with respect to the motorcycle 1 in which both of the front wheel 6 and the rear wheel 25 mount the disc brake thereon. However, the combination of the brakes is not particularly limited to such a combination. For example, the present invention may be also applicable to the motorcycle 1 in which a disc brake is mounted on the front wheel 6 and a drum brake is mounted on the rear wheel 25.

In the above-mentioned embodiments, the explanation is made with respect to the motorcycle 1 on which the water-cooled-type engine 19 is mounted. However, a cooling method of the engine 19 is not particularly limited to such a cooling method. For example, the present invention is also applicable to the motorcycle 1 on which an air-cooled-type or an oil-cooled-type engine 19 is mounted.

Here, in the above-mentioned embodiments, the motorcycle 1 on which the V-type two-cylinder engine 19 is horizontally mounted is explained. However, the number of the cylinders and the arrangement method of the cylinders are not particularly limited to such an embodiment. For example, the present invention is also applicable to the motorcycle 1 on which the engine 19 such as a vertical V-type two-cylinder engine, a parallel-type (inline) four-cylinder engine or the like is mounted.

Here, in the above-mentioned embodiments, the American-type motorcycle 1 is explained. However, the present invention is also applicable to the motorcycle 1 of a type other than the American-type motorcycle such as a motorcycle of a road sport type (European type), an off-road type, a dual-purpose type, a motocross type.

Here, in the above-mentioned second embodiment, the explanation is made with respect to the case in which the annular vibration damping rubber 61 is interposed between the L-shaped channel member 58 and the mounting portion 19a of the engine 19. However, the type of the vibration damping rubber 61 is not limited to the annular shape. Further, it is possible to also use a vibration damping member (for example, a damping resin, a damping alloy or the like) in place of the vibration damping rubber 61.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine support structure of a motorcycle, comprising an engine support bracket extending horizontally between and connected to a pair of left and right down tubes of a vehicle body frame, a mounting portion of an engine, formed on a front end lower portion of the engine, and extending horizontally between the pair of left and right down tubes, is mounted on the engine support bracket from above and is fastened to the engine support bracket using a bolt, fastening holes which are formed in the engine support bracket and the mounting portion of the engine are arranged between the pair of left and right down tubes of the vehicle body frame as viewed in a front view and are overlapped to the vehicle body frame as viewed in a side view, and the mounting portion of the engine is fastened to the engine support bracket using the bolt which is dropped vertically.

2. The engine support structure of a motorcycle according to claim 1, wherein the engine support bracket is constituted of an L-shaped channel member.

3. The engine support structure of a motorcycle according to claim 1, wherein a vibration damping member is interposed between the engine support bracket and the mounting portion of the engine.

4. An engine support structure of a motorcycle, comprising an engine support bracket extending horizontally between and connected to a pair of left and right down tubes of a vehicle body frame, a horizontal mounting portion of an engine, formed on a front end lower portion of the engine, and extending horizontally between the pair of left and right down tubes, is mounted on an upper surface of the engine support bracket from above and fastened to the engine support bracket using at least one bolt, fastening holes formed in the engine support bracket and the mounting portion of the engine, the fastening holes being arranged between the pair of left and right down tubes of the vehicle body frame as viewed in a front view and being overlapped to the vehicle body frame as viewed in aside view, and the mounting portion of the engine is fastened to the engine support bracket using the at least one bolt which is dropped vertically.

5. The engine support structure of a motorcycle according to claim 4, wherein the engine support bracket is constituted of an L-shaped channel member.

6. The engine support structure of a motorcycle according to claim 4, wherein a vibration damping member is interposed between the engine support bracket and the mounting portion of the engine.

7. The engine support structure of a motorcycle according to claim 4, wherein the at least one bolt includes a pair of bolts for fastening right and left sides of the mounting portion of the engine to the engine support bracket.

8. The engine support structure of a motorcycle according to claim 4, wherein the at least one bolt penetrates vertically through the vibration damping member.

9. An engine support structure of a motorcycle, comprising:

an engine support bracket which extends horizontally between and connected to a pair of left and right down tubes of a vehicle body frame, a mounting portion of an engine, which is formed on a front end lower portion of the engine, and which extends horizontally between the pair of left and right down tubes, is mounted on the engine support bracket from above and is fastened to the engine support bracket using a pair of left and right bolts, left and right fastening holes formed in the engine support bracket and the mounting portion of the engine, the fastening holes being arranged between the pair of left and right down tubes of the vehicle body frame as viewed in a front view and being overlapped to the vehicle body frame as viewed in a side view, and the mounting portion of the engine is fastened to the engine support bracket using the left and right bolts which are dropped vertically through the fastening holes.

10. The engine support structure of a motorcycle according to claim 9, wherein the engine support bracket is extended between a lower portion of the pair of left and right down tubes which extend downwardly and outwardly from a head pipe, the left and right down tubes forming an inverted V-shape when viewed in the front view.

* * * * *